(12) United States Patent
Shinjyo et al.

(10) Patent No.: US 6,374,818 B2
(45) Date of Patent: Apr. 23, 2002

(54) APPARATUS FOR DETERMINING A FAILURE OF AN OXYGEN CONCENTRATION SENSOR

(75) Inventors: Akihiro Shinjyo; Hiroshi Kitagawa; Toshihiro Mibe, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/769,242

(22) Filed: Jan. 26, 2001

(30) Foreign Application Priority Data

Jan. 31, 2000 (JP) ........................ 2000-023086
Jan. 31, 2000 (JP) ........................ 2000-023087

(51) Int. Cl.$^7$ ............................................. F02D 41/22
(52) U.S. Cl. ................... 123/688; 123/198 D; 60/276; 73/118.1
(58) Field of Search ................. 123/672, 688, 123/690, 703, 704, 198 D, 198 DB, 326, 682; 60/276, 277; 701/107, 109, 112; 73/118.1; 204/401

(56) References Cited

U.S. PATENT DOCUMENTS 5,672,817 A * 9/1997 Sagisaka et al. ........... 73/118.1
5,956,943 A * 9/1999 Carnevale et al. ............ 60/274
6,131,446 A * 10/2000 Schnaibel et al. .......... 73/118.1
6,226,982 B1 * 5/2001 Poggio et al. ................ 60/276
6,227,033 B1 * 5/2001 Kainz ......................... 73/23.32

FOREIGN PATENT DOCUMENTS

JP    218045  *  8/1999  ........... F02D/41/14

* cited by examiner

Primary Examiner—Tony M. Arganbright
Assistant Examiner—Hai H. Huynh
(74) Attorney, Agent, or Firm—Arent Fox Kintner Plotkin & Kahn, PLLC

(57) ABSTRACT

An apparatus for accurately and promptly determining a failure of an oxygen concentration sensor. The oxygen concentration sensor is arranged at a location downstream of a catalyst in an exhaust system of an internal combustion engine. The apparatus measures a time period elapsed after termination of a fuel cut-off operation, and calculates an integrated amount SUMSVS of exhaust gases exhausted after the termination of the fuel cut-off operation. A failure of the oxygen concentration sensor is determined depending on whether or not a signal value SVO2 of a signal from the oxygen concentration sensor has crossed a predetermined threshold value #SVO2CHK. Further, when a predetermined time period #TMFCCKD has elapsed, if the signal value SVO2 has not crossed the predetermined threshold value #SVO2CHK, and at the same time when the integrated amount SUMSVS of the exhaust gases has not reached a predetermined value #SUMSVAFC the failure determination is suspended.

6 Claims, 9 Drawing Sheets

APPARATUS FOR DETERMINING A FAILURE OF AN OXYGEN CONCENTRATION SENSOR

BACKGROUND OF THE INVENTION

1. Field of the Invention

This invention relates to an apparatus for determining a failure of an oxygen concentration sensor that is arranged at a location downstream of a catalyst in the exhaust system of an internal combustion engine and detects a concentration of oxygen in exhaust gases.

2. Description of the Prior Art

Conventionally, an apparatus for determining a failure of an oxygen concentration sensor that is arranged in the exhaust system of an internal combustion engine has been proposed e.g. in Japanese Laid-Open Patent Publication (Kokai) No. 4-36651, in which a failure of the oxygen concentration sensor (hereinafter referred to as "the O2 sensor") is determined in the following manner: First, the output (hereinafter referred to as "the sensor output") from the O2 sensor is sampled before, during, and after a fuel cut-off operation (hereinafter referred to as "the F/C operation") in which supply of fuel to the engine is cut off. When a gradient of fall (response) of the sensor output immediately after the start of the F/C operation is smaller than a predetermined reference value, when a gradient of rise of the sensor output immediately after the end of the F/C operation is smaller than a predetermined reference value, or when the difference between the minimum value of the sensor output during the F/C operation and the maximum value of the sensor output after the termination of the F/C operation is smaller than a predetermined value, it is determined that the O2 sensor has failed (been degraded).

According to the above conventional apparatus, for instance, if the engine is running in idle immediately after termination of the F/C operation, the amount of exhaust gases supplied to the O2 sensor is very small, so that the gradient of rise of the sensor output can be smaller than the above predetermined reference value, causing erroneous determination that the O2 sensor has failed although actually it has not.

Further, if the apparatus is applied to an O2 sensor arranged at a location downstream of a catalyst in an exhaust pipe, the following inconvenience arises: During an F/C operation, oxygen is stored in the catalyst, so that immediately after termination of the F/C operation, the concentration of oxygen in exhaust gases having passed through the catalyst is high. As a result, the gradient of rise of the sensor output can be smaller than the predetermined reference value, or the above difference between the minimum value of the sensor output during the F/C operation and the maximum value of the sensor output after the termination of the F/C operation can be smaller than the predetermined value, causing the same erroneous determination as mentioned above.

SUMMARY OF THE INVENTION

It is an object of the invention to provide an apparatus for determining a failure of an oxygen concentration sensor, which is capable of accurately and promptly determining the failure of the sensor.

To attain the above object, the invention provides an apparatus for determining a failure of an oxygen concentration sensor of an internal combustion engine that includes an exhaust system, and a catalyst arranged in the exhaust system, and is capable of carrying out a fuel cut-off operation, the oxygen concentration sensor being arranged in the exhaust system at a location downstream of the catalyst, for generating a signal indicative of a sensed concentration of oxygen in exhaust gases.

The apparatus according to the first aspect of the invention is characterized by comprising:

oxygen concentration change-determining means for determining whether or not a signal value of the signal from the oxygen concentration sensor has crossed a predetermined threshold value after termination of the fuel cut-off operation;

exhaust gas amount calculation means for calculating an integrated amount of the exhaust gases exhausted from the engine after the termination of the fuel cut-off operation; and failure determination means for determining that the oxygen concentration sensor has failed when the oxygen concentration change-determining means determines that the signal value has not crossed the predetermined threshold value, in the case of the integrated amount of the exhaust gases having reached a predetermined value.

According to this apparatus, it is determined whether or not the signal value of the signal from the oxygen concentration sensor has crossed the predetermined threshold value after termination of a fuel cut-off operation, and when the integrated amount of exhaust gases exhausted after the termination of the fuel cut-off operation has reached the predetermined value, if it is determined that the signal value has not crossed the predetermine threshold value, it is determined that the oxygen concentration sensor has failed. Thus, when the integrated amount of exhaust gases has reached the predetermined value, the determination of a failure of the oxygen concentration sensor is carried out based on the signal value output therefrom. Therefore, even when the amount of exhaust gases is small, it is possible to determine the failure of the oxygen concentration sensor when the exhaust gases are supplied to the catalyst in a sufficient amount, i.e. when the catalyst has recovered from its excess oxygen-storing state in which too much oxygen is stored, by full consumption of the stored oxygen by the exhaust gases. This enables accurate determination of a failure of the oxygen concentration sensor.

Preferably, the apparatus further includes failure determination-suspending means for suspending determination of the failure of the oxygen concentration sensor by the failure determination means, when a predetermined time period has elapsed after the termination of the fuel cut-off operation, on condition that the integrated amount of the exhaust gases has not reached the predetermined value, and at the same time, the oxygen concentration sensor determines that the signal value has not crossed the predetermined threshold value.

According to this preferred embodiment, on condition that the integrated amount of exhaust gases has not reached the predetermined value, and at the same time it is determined that the signal value from the sensor has not crossed the predetermined threshold value, when the predetermined time has passed after the termination of the fuel cut-off operation, i.e. when exhaust gases continue to be supplied in a small amount over a long time period, the determination of a failure of the oxygen concentration sensor by the failure determination means is suspended. This makes it possible to prevent an increase in an error in the integrated amount of exhaust gases resulting from a long-term integration of a small amount of the supply of exhaust gases thereto, and thereby prevent an erroneous determination of a failure of the oxygen concentration sensor due to an erroneous value of the integrated amount of exhaust gases. Further, since the determination of a failure of the oxygen sensor is suspended with reference to the predetermined time period elapsed after the termination of the fuel cut-off operation, it is possible to properly set the timing of discontinuation of the oxygen concentration sensor failure determination process.

Preferably, the apparatus further includes air-fuel mixture-enriching means that makes an air-fuel mixture supplied to the internal combustion engine immediately after the termination of the fuel cut-off operation, richer than a stoichiometric air-fuel ratio.

According to this preferred embodiment, an air-fuel mixture richer than the stoichiometric air-fuel ratio is supplied to the internal combustion engine immediately after termination of an fuel cut-off operation, whereby exhaust gases containing a high concentration of HC and a high concentration of CO are supplied to the catalyst. This makes it possible to positively cause consumption of oxygen stored in the catalyst during the fuel cut-off operation, thereby causing the catalyst to promptly recover from a state in which an excessive amount of oxygen is stored therein. As a result, exhaust gases with a rich air-fuel ratio, i.e. having a low concentration of oxygen can be supplied to the oxygen concentration sensor soon after termination of the fuel cut-off operation, whereby it is possible to promptly determine a failure of the oxygen concentration sensor, as described above.

To attain the above object, according to a second aspect of the invention, there is provided an apparatus for determining a failure of an oxygen concentration sensor of an internal combustion engine that includes an exhaust system, and a catalyst arranged in the exhaust system, and is capable of carrying out a fuel cut-off operation, the oxygen concentration sensor being arranged in the exhaust system at a location downstream of the catalyst, for generating a signal indicative of a sensed concentration of oxygen in exhaust gases.

The apparatus according to the second aspect of the invention is characterized by comprising:

timer means for measuring a time period elapsed after termination of the fuel cut-off operation;

oxygen concentration change-determining means for determining whether or not a signal value of the signal from the oxygen concentration sensor has crossed a predetermined threshold value after the termination of the fuel cut-off operation;

exhaust gas amount calculation means for calculating an integrated amount of the exhaust gases exhausted from the engine after the termination of the fuel cut-off operation;

failure determination means for determining the failure of the oxygen concentration sensor based on a result of determination of the oxygen concentration change-determining means; and failure determination-suspending means for suspending the determination of the failure of the oxygen concentration sensor by the failure determination means, when the time period measured by the timer means has reached a predetermined time period, on condition that the oxygen concentration sensor determines that the signal value has not crossed the predetermined threshold value, and at the same time the integrated amount of the exhaust gases has not reached a predetermined value.

According to this apparatus, it is determined whether or not the signal value of the signal from the oxygen concentration sensor has crossed the predetermined threshold value after termination of a fuel cut-off operation, and the integrated amount of exhaust gases exhausted after the termination of the fuel cut-off operation is calculated. Then, a failure of the oxygen concentration sensor is determined based on a result of determination of the oxygen concentration change-determining means. Further, when a time period elapsed after the termination of the fuel cut-off operation has reached a predetermined time period, if the signal value output from the oxygen concentration sensor has not crossed the predetermined threshold value, and at the same time the integrated amount of the exhaust gases has not reached the predetermined value, failure determination on the oxygen concentration sensor is suspended. Thus, when the predetermined time period has elapsed after termination of a fuel cut-off operation, if exhaust gases are not sufficiently supplied to the oxygen concentration sensor, differently from the conventional oxygen concentration sensor, determination of a failure of the sensor is not carried out unless the signal value from the oxygen concentration sensor has crossed the predetermined threshold value. Hence, it is possible to prevent erroneous determination of a failure of the sensor, which can be caused by an insufficient supply of exhaust gases to the oxygen concentration sensor.

Preferably, the apparatus further includes air-fuel mixture-enriching means that makes an air-fuel mixture which is supplied to the internal combustion engine immediately after the termination of the fuel cut-off operation, richer than a stoichiometric air-fuel ratio.

The above and other objects, features, and advantages of the invention will become more apparent from the following detailed description taken in conjunction with the accompanying drawings.

DETAILED DESCRIPTION

Figure 1:
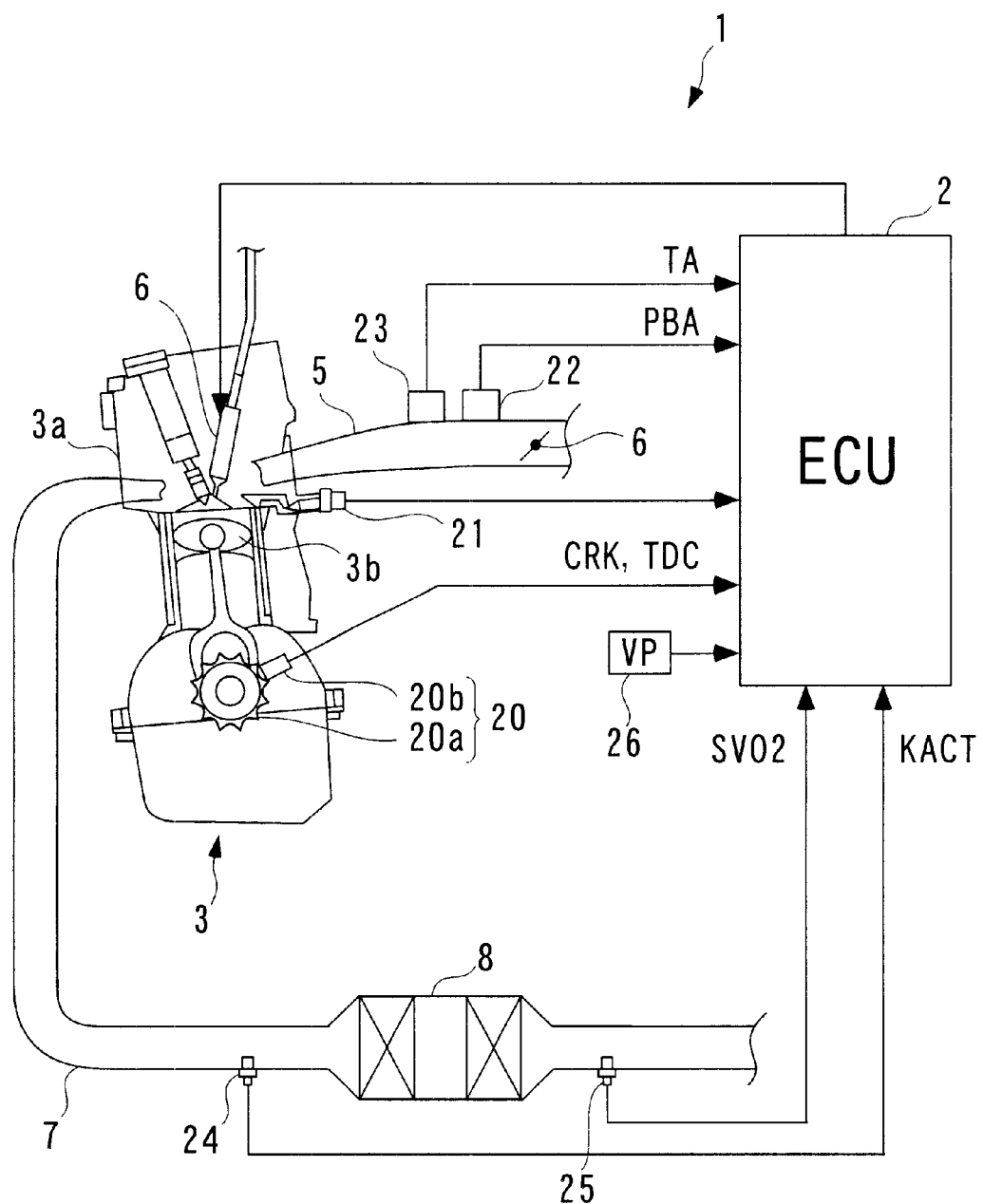
FIG. 1 is a block diagram schematically showing the arrangement of an internal combustion engine to which is applied an apparatus for determining a failure of an oxygen concentration sensor, according to a first embodiment of the invention.

The invention will now be described in detail with reference to the drawings showing an embodiment thereof. Referring first to FIG. 1, there is schematically shown the arrangement of an apparatus for determining a failure of an oxygen concentration sensor, according to a first embodiment of the invention. As shown in the figure, this apparatus 1 includes an ECU 2 (oxygen concentration change-determining means, exhaust gas amount calculation means, failure determination means, failure determination-suspending means, air-fuel mixture-enriching means). The ECU 2 controls the air-fuel ratio of an internal combustion engine 3 (hereinafter simply referred to as "the engine 3"), and determines based on conditions of exhaust gases emitted from the engine 3 whether or not the oxygen concentration sensor has failed, as will be described in detail hereinafter.

The engine 3 is a straight type four-cylinder gasoline engine of a so-called direct injection type in which fuel is directly injected into a combustion chamber of the engine. Each cylinder has a corresponding cylinder head portion 3a having a fuel injection valve 4 (hereinafter simply referred to as "the injector 4") mounted therein. The injector 4 is electrically connected to the ECU 2 such that a fuel injection time period TOUT of the injector 4 is controlled in response to a drive signal delivered from the ECU 2. Thus, the amount of fuel to be supplied to the engine 3 is controlled by controlling the fuel injection time period TOUT.

The engine 3 has a crankshaft, not shown, to which is mounted a magnet rotor 20a which constitutes a crank angle position sensor 20 together with an MRE (magnetic resistance element) pickup 20b. The crank angle position sensor 20 delivers to the ECU 2 a CRK signal and a TDC signal, which are both pulse signals, in accordance with rotation of the crankshaft. The CRK signal is indicative of a sensed rotational angle position of the crankshaft, and each pulse of the CRK signal (CRK signal pulse) is generated at each of predetermined crank angle positions whenever the crankshaft rotates through a predetermined angle (e.g. one degree). The ECU 2 determines a rotational speed NE of the engine 3 (engine rotational speed NE) based on the CRK signal. On the other hand, each pulse of the TDC signal (TDC signal pulse) is generated at a predetermined crank angle position of each cylinder in the vicinity of a top dead center position at the start of an intake stroke of the piston 3b in the cylinder whenever the crankshaft rotates through 180 degrees in the case of the engine 3 according to the embodiment.

An engine coolant temperature sensor 21 formed of a thermistor or the like is mounted in the cylinder block of the engine 3. The engine coolant temperature sensor 21 senses an engine coolant temperature TW which is a temperature of an engine coolant circulating within the cylinder block of the engine 3 and supplies an electric signal indicative of the sensed engine coolant temperature to the ECU 2.

The engine 3 has an intake pipe 5 having a throttle valve 6 arranged in an intermediate portion thereof. An intake pipe absolute pressure sensor 22 is inserted into the intake pipe 5 at a location downstream of the throttle valve 6. The intake pipe absolute pressure sensor 22 formed e.g. by a semiconductor pressure sensor senses an intake pipe absolute pressure PBA within the intake pipe 5, and delivers a signal indicative of the sensed absolute pressure PBA to the ECU 2. Further, an intake air temperature sensor 23 is inserted into the intake pipe 5 at a location downstream of the intake pipe absolute pressure sensor 22. The intake air temperature sensor 23 formed of a thermistor or the like senses an intake air temperature TA within the intake pipe 5 and delivers a signal indicative of the sensed temperature TA to the ECU 2.

On the other hand, arranged in an intermediate portion of an exhaust pipe 7 is a catalyst device 8 (catalyst). The catalyst device 8 is a combination of an NOx catalyst and a three-way catalyst, which purifies NOx in exhaust gases emitted during lean burn drive operation of the engine 3 by oxidation-reduction catalytic actions of the NOx catalyst, and purifies CO, HC, and NOx in exhaust gases emitted during drive operations of the engine 3 other than the lean burn drive operation by oxidation-reduction catalytic actions of the three-way catalyst.

A LAF sensor 24 is arranged at a location upstream of the catalyst device 8. The LAF sensor 24 is comprised of zirconia, platinum electrodes, and the like, and linearly detects the concentration of oxygen in exhaust gases in a broad air-fuel ratio range from a rich region to a lean region, to deliver a signal proportional to the sensed concentration of oxygen to the ECU 2.

At a location downstream of the catalyst device 8, there is arranged an oxygen concentration sensor 25 (hereinafter referred to as "the O2 sensor 25"). The O2 sensor 25 is comprised of zirconia, platinum electrodes, and the like, and detects the concentration of oxygen in exhaust gases at a location downstream of the catalyst device 8, to deliver a signal indicative of the sensed oxygen concentration to the ECU 2. More specifically, a signal value SVO2 of the signal from the O2 sensor 25 assumes a high-level voltage value (e.g. 0.8V) when an air-fuel mixture richer than a stoichiometric air-fuel ratio is burned, whereas when a lean air-fuel mixture is burned, the signal value SVO2 assumes a low-level voltage value (e.g. 0V).

Further, a vehicle speed sensor 26 is arranged in an automotive vehicle, not shown, having the engine 3 mounted therein. The vehicle speed sensor 26 detects a traveling speed (vehicle speed) VP of the vehicle, and delivers a signal indicative of the sensed vehicle speed VP to the ECU 2.

The ECU 2 is formed by a microcomputer including a CPU, a RAM, a ROM, and an I/O interface, none of which are shown. The signals input from the sensors 20 to 26 to the ECU 2 are each delivered to the I/O interface for A/D conversion and waveform shaping, and then inputted into the CPU. The CPU carries out an executable condition determination process and a failure determination process, for determining a failure or breakdown of the O2 sensor 25 in response to the above signals, as will be described in detail hereinafter.

Figure 7:
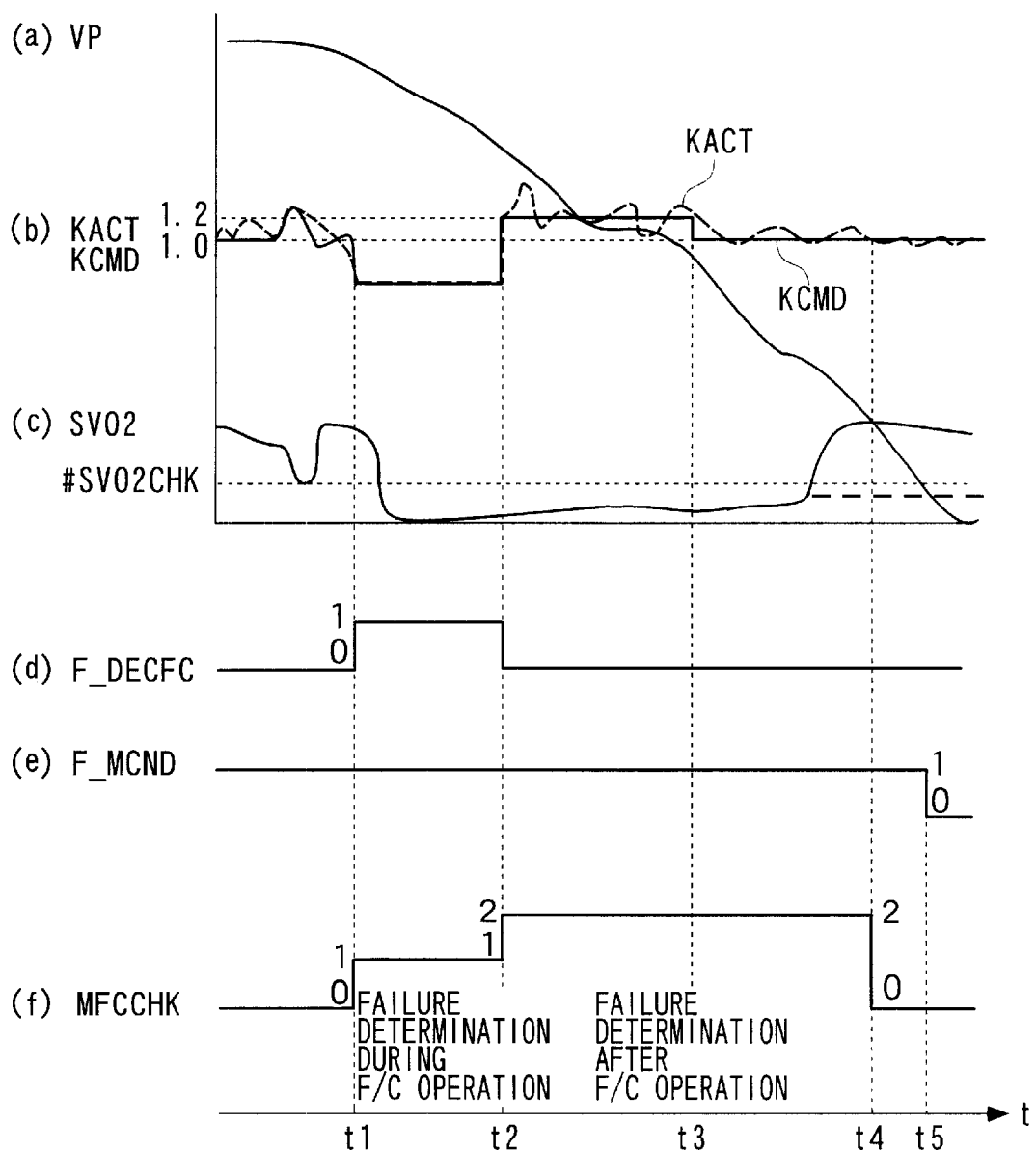
FIG. 7 is a timing chart showing examples of changes in a vehicle speed VP, a signal value KACT of a signal from a LAF sensor, a signal value SVO2 of a signal from the oxygen concentration sensor, and a desired air-fuel ratio KCMD, with the lapse of time, as well as changes in flags F_DECFC, F_MCND, and a monitor flag MFCCHK, which take place during the executable condition determination process and the failure determination process shown in FIGS. 2 to 5.

Further, the CPU determines a desired air-fuel ratio KCMD based on operating conditions of the engine 3, and feedback-controls the air-fuel ratio of an air-fuel mixture such that a signal value KACT of the signal from the LAF sensor 24 becomes equal to the desired air-fuel ratio KCMD (see FIG. 7). The desired air-fuel ratio KCMD and the signal value KACT are each represented by an equivalent ratio which is proportional to the reciprocal of an air-fuel ratio corresponding thereto. Particularly, the desired air-fuel ratio KCMD is set to a value 1.0 when it is equal to the stoichiometric air-fuel ratio, whereas when the desired air-fuel ratio KCMD is richer than the stoichiometric air-fuel ratio, the same is set to a value larger than the value 1.0. In this air-fuel ratio control, when conditions for a deceleration fuel cut-off operation (hereinafter referred to as "F/C operation") are satisfied, supply of fuel to the combustion chamber by the injector 4 is cut off, thereby causing the engine 3 to carry out the F/C operation.

After termination of the F/C operation, the desired air-fuel ratio KCMD is held at a value (e.g. 1.2) larger than the stoichiometric air-fuel ratio (1.0) for a predetermined time period (time period from a time t2 to a time t3 in FIG. 7). In short, the mixture is enriched, whereby rich exhaust gases having a low concentration of oxygen are supplied to the catalyst device 8. The air-fuel ratio is controlled as described above for the following reasons: During an F/C operation, lean exhaust gases having a very high concentration of oxygen are supplied to the catalyst device 8, whereby an excessive amount of oxygen is stored in the catalyst device 8, and after termination of the F/C operation, a state continues in which the signal value SVO2 of the signal from the O2 sensor 25 is not changed from the low level to the high level, which makes it impossible to accurately determine a failure of the O2 sensor 25. To overcome this problem, the air-fuel ratio is enriched after termination of an F/C operation to thereby cause the catalyst device 8 to promptly recover from an excess oxygen-storing state in which the excessive amount of oxygen is stored therein.

Figure 2:
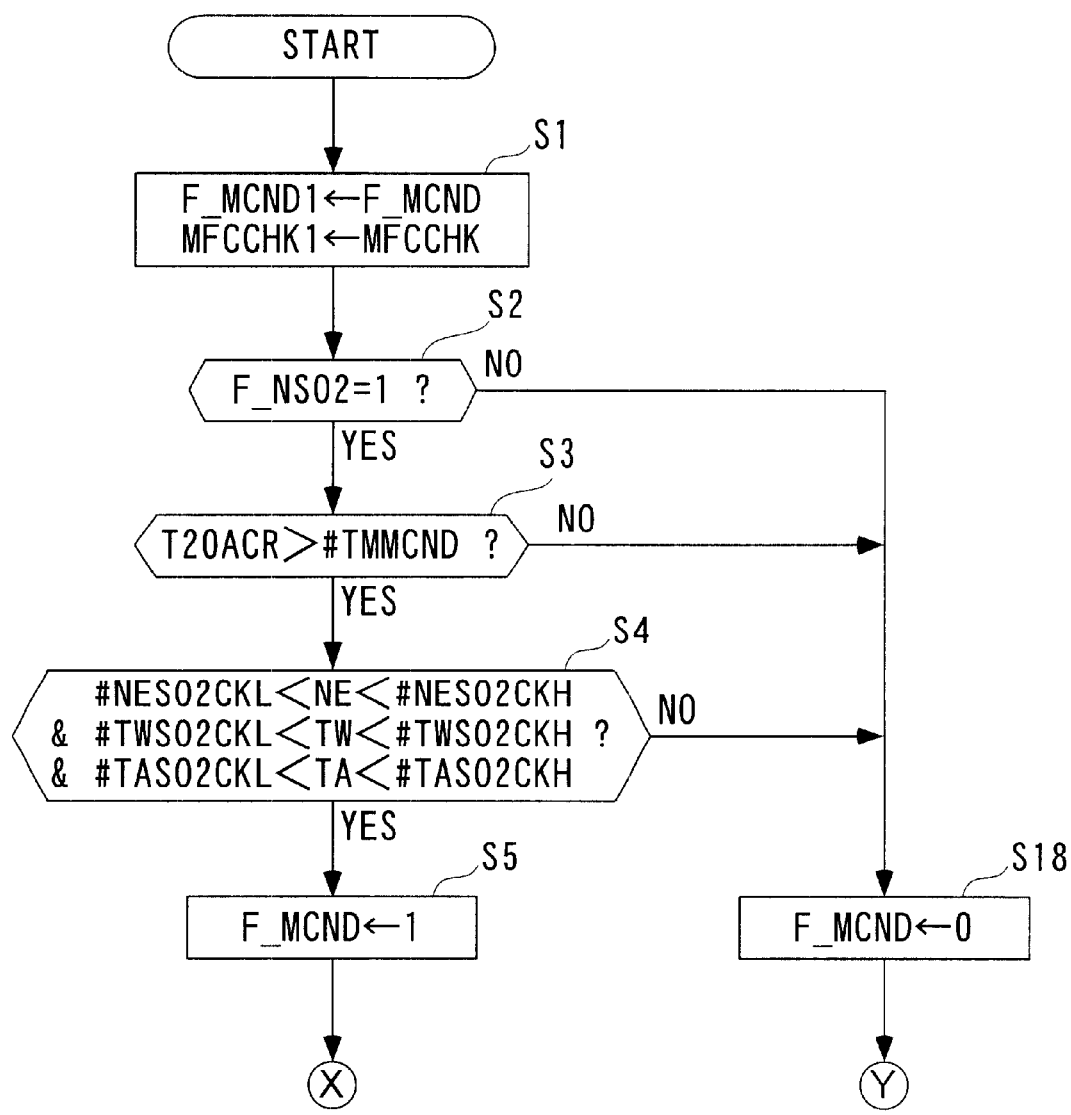
FIG. 2 is a flowchart showing a program executed by the apparatus according the first embodiment, for carrying out an executable condition determination process for determining a failure of the oxygen concentration sensor.
Figure 3:
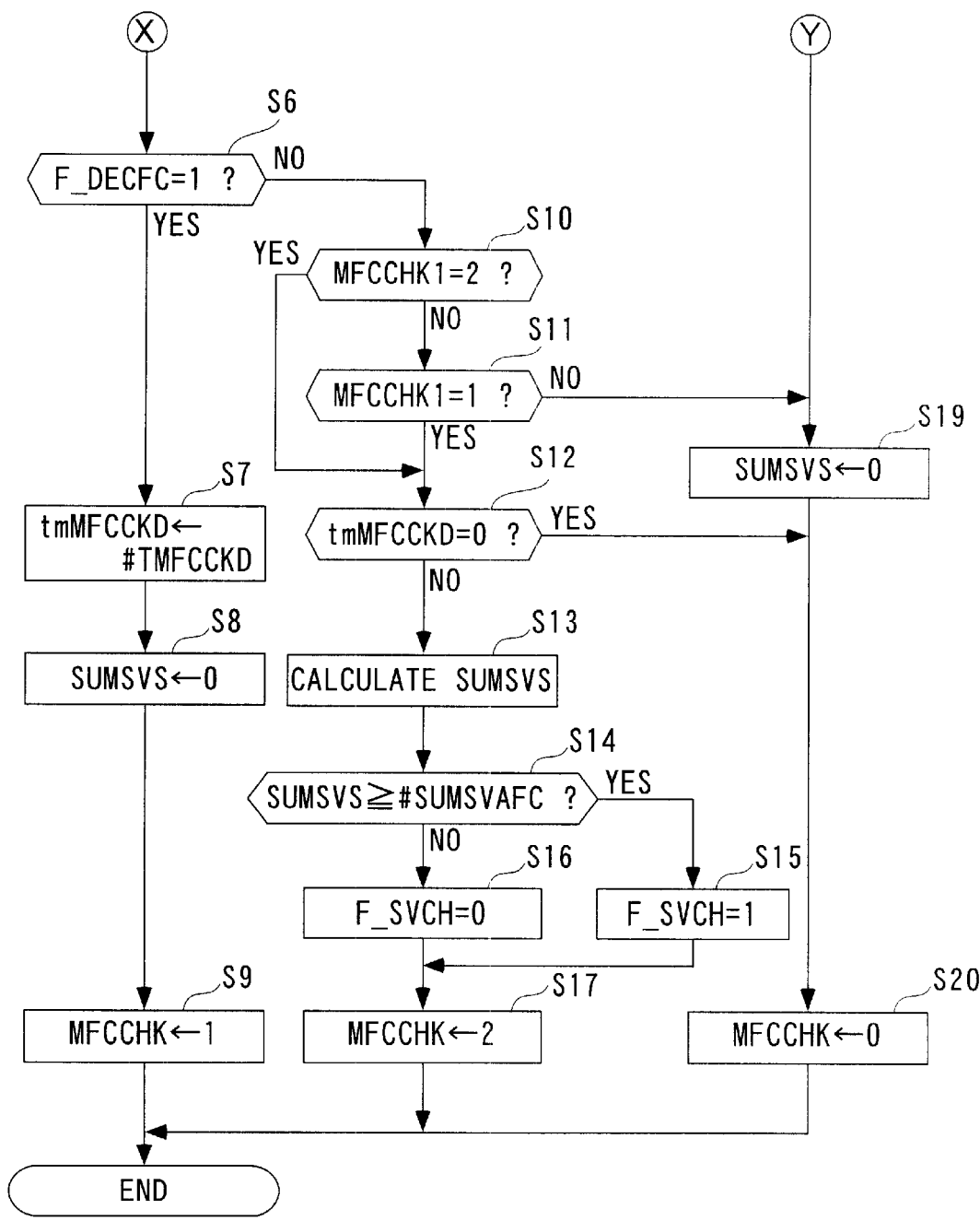
FIG. 3 is a continuation of the FIG. 2 flowchart.

FIGS. 2 and 3 are flowcharts showing a program for carrying out the executable condition determination process, in which it is determined whether or not conditions for carrying out a failure determination process for determining a failure of the O2 sensor 25 are satisfied, and flags and a monitor fag are set according to results of the determination. The executable condition determination process is executed by an interrupt handling routine in synchronism with generation of the TDC signal.

In the executable condition determination process, first, at a step S1, values of a flag F_MCND and a monitor flag MFCCHK, stored in the RAM are set to immediately preceding values F_MCND1 and MFCCHK1, respectively.

Next, the program proceeds to a step S2, wherein it is determined whether or not a flag F_NSO2 assumes 1. The flag F_NSO2 is set to "1" when the O2 sensor 25 is activated, whereas when the sensor is not active, the flag F_NSO2 is set to "0". If the answer to the question of the step S2 is affirmative (Yes), i.e. if the flag F_NSO2=1 holds, the program proceeds to a next step S3, wherein it is determined whether or not a time period T2OACR elapsed after the start of the engine 3 is longer than a predetermined time period #TMMCND. This determination is carried out to prevent inaccurate determination of a failure of the O2 sensor 25, which can be caused by an unstable operating condition of the O2 sensor 25 due to a low temperature of its sensor element immediately after the start of the engine 3. Therefore, the predetermined time period #TMMCND is set to a value (e.g. 60 sec) long enough to place the O2 sensor 25 in a stable operating condition.

If the answer to the question of the step S3 is affirmative (Yes), i.e. if the time period T2OACR>#TMMCND holds, the program proceeds to a next step S4, wherein it is determined whether or not the engine rotational speed NE, the engine coolant temperature TW, and the intake air temperature TA satisfy the following conditions:

NESO2CKL<NE<#NESO2CKH
TWSO2CKL<TW<#TWSO2CKH
TASO2CKL<TA<#TASO2CKH

The upper and lower limit values of the above inequalities are used for determining whether or not the engine 3 is in an operating condition assumed to be stable enough to permit determination of a failure of the O2 sensor 25. The lower and upper limit values #NESO2CKL and #NESO2CKH of the engine rotational speed NE are set e.g. to 500 rpm and 4000 rpm, respectively. The lower and upper limit values #TWSO2CKL and #TWSO2CKH of the engine coolant temperature TW are set e.g. to 50° C. and 100° C., respectively. Further, the lower and upper limit values #TASO2CKL and #TASO2CKH of the intake air temperature TA are set e.g. to 0° C. and 50° C., respectively.

If the answer to the question of the step S4 is affirmative (Yes), i.e. if the engine rotational speed NE, the engine coolant temperature TW, and the intake air temperature TA satisfy the above conditions, the program proceeds to a next step S5, wherein the flag F_MCND is set to "1".

Next, the program proceeds to a next step S6 in FIG. 3, wherein it is determined whether or not a flag F_DECFC assumes "1". This flag F_DECFC is set to "1" when the engine 3 is in the F/C operation, whereas when the engine 3 is in the other operating conditions, the flag F DECFC is set to "0". If the answer to the question of the step S6 is affirmative (Yes), i.e. if F_DECFC=1 holds, the program proceeds to the following step S7, wherein a downcount timer tmMFCCKD is set to a predetermined time period #TMFCCKD. This timer tmMFCCKD is a program timer implemented by a program and used for determining whether or not the predetermined time period #TMFCCKD has elapsed after termination of an F/C operation. The predetermined time period #TMFCCKD is set to a value (e.g. 30 sec) over which rich exhaust gases are supplied to the catalyst device 8 after termination of an F/C operation, under normal operating conditions of the engine 3, in an amount expected to be sufficient for causing the catalyst device 8 to recover from its excess oxygen-storing state.

Next, the program proceeds to the following step S8, wherein an integrated amount SUMSVS is set to "0". Then, the program proceeds to the following step S9, wherein the monitor flag MFCCHK is set to "1", followed by immediately terminating the program. The integrated amount SUMSVS designates an integrated value of the amount of exhaust gases exhausted after termination of an F/C operation, and is calculated at a step S13, referred to hereinafter. Further, the monitor flag MFCCHK is employed in carrying out failure determination (i.e. determination of a failure of the O2 sensor 25), and set to "1" when the execution conditions for determining a failure of the O2 sensor 25 during the F/C operation are satisfied, as described above.

On the other hand, if the answer to the question of the step S6 is negative (No), i.e. if the flag F_DECFC=0 holds, which means that the engine 3 is not in the F/C operation, the program proceeds to a step S10, wherein it is determined whether or not the immediately preceding value MFCCHK1 of the monitor flag MFCCHK assumes "2". If the answer to the question of the step S10 is negative (No), the program proceeds to a step S11, wherein it is determined whether or not the immediately preceding value MFCCHK1 of the monitor flag MFCCHK assumes "1". If this is a first loop carried out immediately after termination of an F/C operation, the answer to the question of the step S10 is negative (No), and the answer to the question of the step S11 is affirmative (Yes), so that the program proceeds to a step S12, wherein it is determined whether or not the timer tmMFCCKD has timed out.

If this a first loop carried out immediately after termination of an F/C operation, the answer to the question of the step S12 is negative (No), and hence the program proceeds to a next step S13, wherein the integrated amount SUMSVS is calculated. The integrated amount SUMSVS is calculated by using a space velocity defined by the engine rotational speed NE, the intake pipe absolute pressure PBA, and the capacity of the catalyst. Then, the program proceeds to a next step S14, wherein it is determined whether or not the integrated amount SUMSVS is equal to or larger than a predetermined value #SUMSVAFC. This predetermined value #SUMSVAFC is set to a value large enough for the catalyst device 8 to recover from its excess oxygen-storing state, after termination of an F/C operation.

If the answer to the question of the step S14 is affirmative (Yes), i.e. if SUMSVS≧#SUMSVAFC holds, it is judged that a sufficient amount of exhaust gases has been supplied to the O2 sensor 25 after the termination of the F/C operation, and the catalyst device 8 has recovered from its excess oxygen-storing state, and to indicate this, the program proceeds to a step S15, wherein an integrated amount flag F_SVCH is set to "1". On the other hand, if the answer to the question of the step S14 is negative (No), i.e. if SUMSVS<#SUMSVAFC holds, it is judged that a sufficient amount of exhaust gases has not been supplied to the O2 sensor 25 after the termination of the F/C operation, and to indicate this, the program proceeds to a step S16, wherein the integrated amount flag F_SVCH is set to "0".

From the step S15 or S16, the program proceeds to a step S17, wherein the monitor flag MFCCHK is set to "2", followed by immediately terminating the program. As described hereinabove, when the execution conditions for determining a failure of the O2 sensor 25 after the termination of the F/C operation are satisfied, and at the same time the timer tmMFCCKD has not yet timed out, the monitor flag MFCCHK is set to "2".

Further, if this is a second or later loop carried out after the termination of the F/C operation, the answer to the question of the step S10 is affirmative (Yes), so that the program proceeds to the step S12 by skipping over the step 11, and the steps S12 to S17 are carried out similarly to the above, followed by terminating the program. When the predetermined time period #TMFCCKD has elapsed immediately after the termination of the F/C operation, the answer to the question of the step S12 is affirmative (Yes), and hence the program proceeds to a step S20, wherein the monitor flag MFCCHK is set to "0", followed by terminating the program. As described hereinabove, the integrated amount SUMSVS continues to be calculated until the predetermined time period #TMFCCKD elapses.

On the other hand, if the answer to the question of the step S2, S3 or S4 is negative (No), the flag F_MCND is set to "0", the integrated amount SUMSVS is set to "0", and further the monitor flag MFCCHK is set to "0" (steps S18 to S20), followed by terminating the program. As described above, when the execution conditions for determining a failure of the O2 sensor 25 are not satisfied, or when the predetermined time period #TMFCCKD has elapsed immediately after the termination of the F/C operation, the monitor flag MFCCHK is set to "0".

Figure 4:
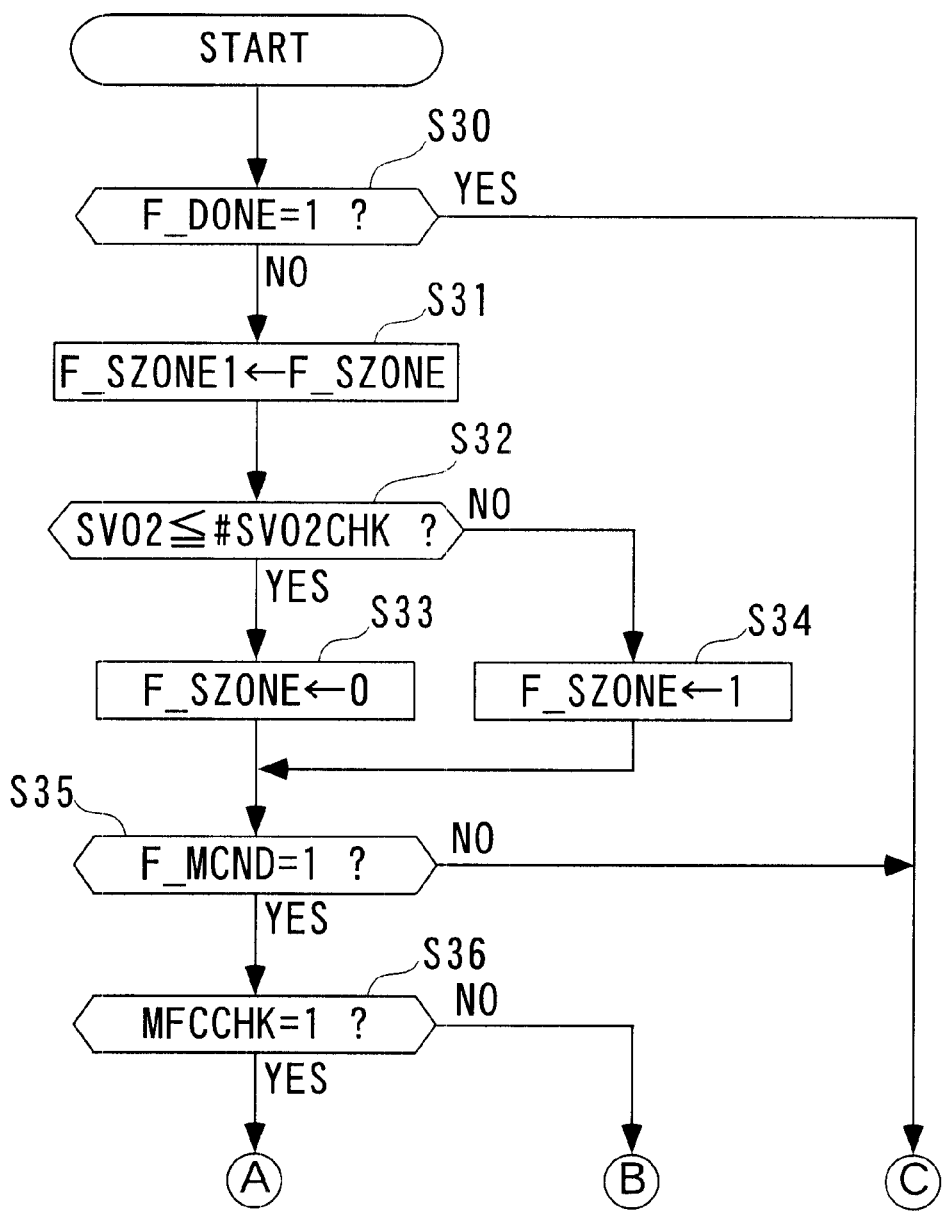
FIG. 4 is a flowchart showing part of a program executed by the apparatus according the first embodiment, for carrying out a failure determination process for determining a failure of the oxygen concentration sensor.
Figure 5:
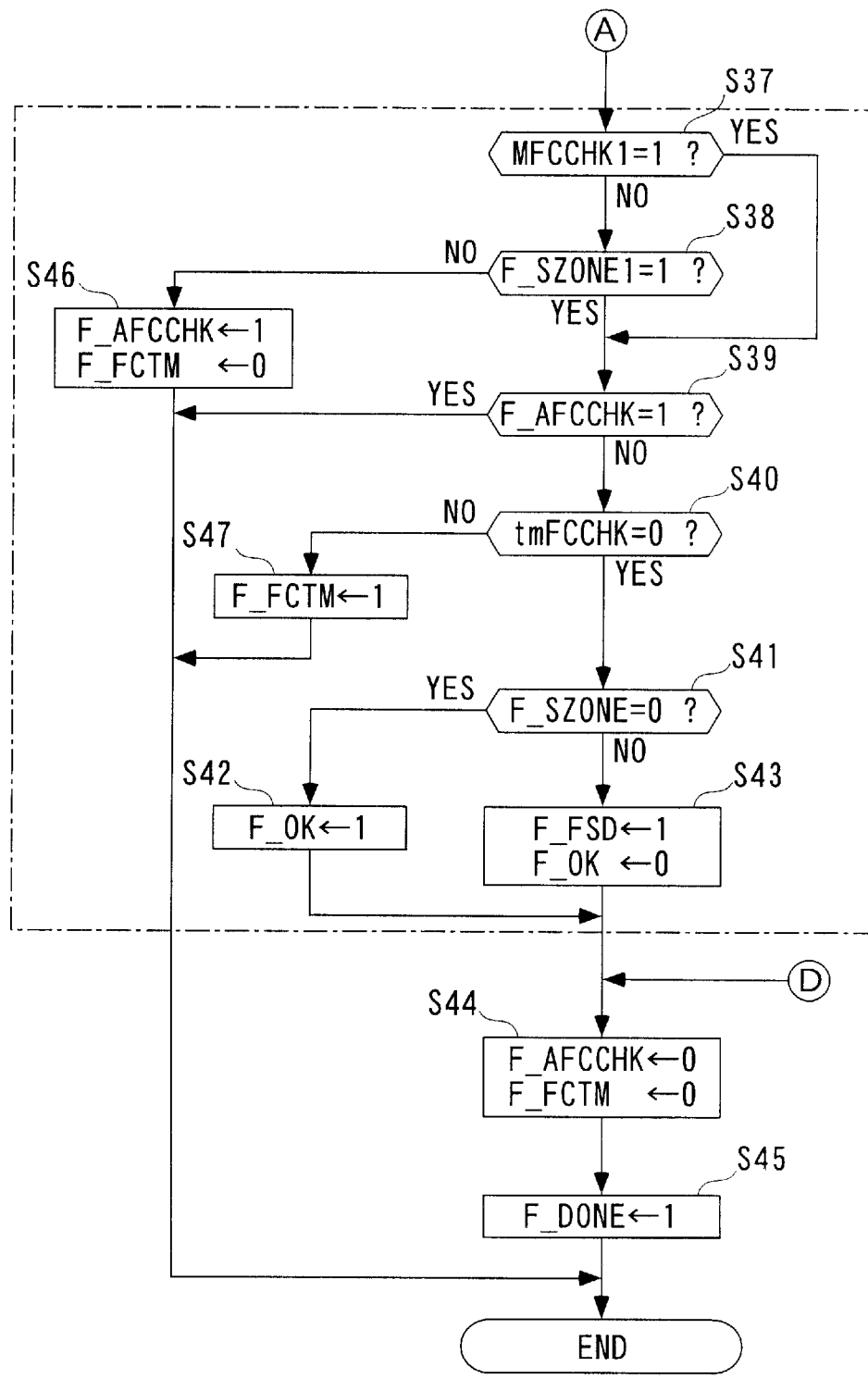
FIG. 5 is a continuation of the FIG. 4 flowchart, which includes a portion of the program executed particularly during a fuel cut-off operation.

Next, a main routine for carrying out the failure determination process for determining a failure of the O2 sensor 25 will be described with reference to FIGS. 4 to 6. The failure determination process is executed by an interrupt handling routine following the above executable condition determination process, when the TDC signal is generated. Further, in FIGS. 5 and 6, portions enclosed by one-dot chain lines indicate steps of failure determination carried out during an F/C operation, and steps of failure determination carried out after the termination of the F/C operation, respectively.

In the failure determination process, first, it is determined at a step S30 whether or not a flag F_DONE assumes "1". This flag F_DONE is set to "0" when the engine 3 is started, and as described hereinafter, when failure determination is carried out on the O2 sensor 25 by the present process, the flag F_DONE is set to "1" (see a step S45).

Figure 6:
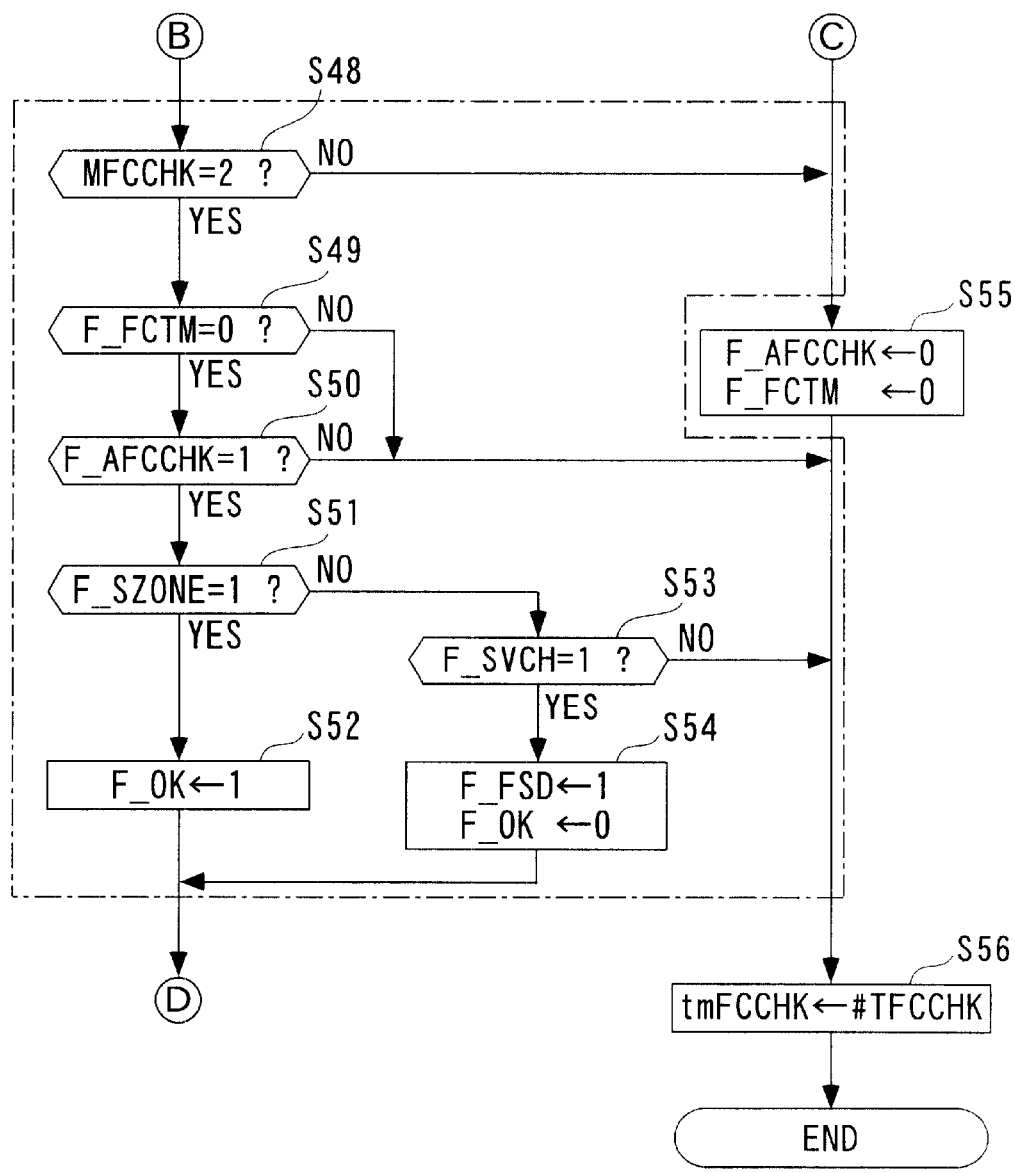
FIG. 6 is a continuation of the FIG. 4 flowchart which includes a portion of the program executed particularly after termination of the fuel cut-off operation.

If the answer to the question of the step S30 is affirmative (Yes), i.e. if F_DONE=1 holds, and failure determination has been carried out on the O2 sensor 25, the program proceeds to a step S55 in FIG. 6, wherein a flag F_AFCCHK and a flag F_FCTM are set to "0". As will be described hereinafter, the flag F_AFCCHK is set to "1" on condition that the engine 3 has entered an F/C operation from a lean air-fuel ratio operating condition of the engine, and provided for carrying out failure determination after termination of the F/C operation in such a case. Further, the flag F_FCTM continues to be set to "1" until a predetermined time period #TFCCHK elapses on condition that the engine has entered an F/C operation from a rich air-fuel ratio operating condition of the engine. This is for inhibiting execution of failure determination after termination of an F/C operation when the F/C operation terminated before the predetermined time period #TFCCHK elapses.

Next, the program proceeds to a step S56, wherein a downcount timer tmFCCHK is set to a predetermined time period #TFCCHK, followed by terminating the program. This predetermined time period #TFCCHK is set as delay time (e.g. 1 sec) for delaying execution of failure determination until the concentration of oxygen in exhaust gases becomes stable after the engine 3 enters the F/C operation.

If the answer to the question of the step S30 is negative (No), i.e. if F_DONE=0 holds, which means the failure determination has not yet been carried out, the program proceeds to a step S31, wherein a value of a flag F_SZONE currently stored in the RAM is set to its immediately preceding value F_SZONE1.

Next, the program proceeds to a step S32, wherein it is determined whether or not the signal value SVO2 of the signal from the O2 sensor 25 is equal to or smaller than a predetermined threshold value #SVO2CHK. The threshold value #SVO2CHK is set to a value (e.g. 0.2V) which is positively crossed by the signal value SVO2 when the signal value SVO2 is changed between the low level and the high level in accordance with a change in the air-fuel ratio of the air-fuel mixture between the rich region and the lean region.

If the answer to the question of the step S32 is affirmative (Yes), i.e. if SVO2≦#SVO2CHK holds, which means that the air-fuel ratio is lean, the program proceeds to a step S33, wherein the flag F_SZONE is set to "0" to indicate the lean status of the air-fuel ratio. On the other hand, if the answer to the question of the step S32 is negative (No), i.e. if SVO2>#SVO2CHK holds, which means that the air-fuel ratio is rich, the program proceeds to a step S34, wherein the flag F_SZONE is set to "1" to indicate the rich status of the air-fuel ratio.

From the step S33 or S34, the program proceeds to a step S35, wherein it is determined whether or not the flag F_MCND set at the step 55 or the step S18 described above with reference to FIG. 2 assumes "1". If the answer to the question of the step S35 is negative (No), i.e. if F_MCND=0 holds, which means that the execution conditions for carrying out failure determination on the O2 sensor 25 are not satisfied, the steps S55 and S56 are carried out, followed by terminating the program.

On the other hand, if the answer to the question of the step S35 is affirmative (Yes), i.e. if F_MCND=1 holds, which means that the execution conditions for carrying out the failure determination are satisfied, the program proceeds to a step S36, wherein it is determined whether or not the monitor flag MFCCHK assumes "1". If the answer to the question of the step S36 is affirmative (Yes), i.e. if MFCCHK=1 holds, which means that the engine 3 is in the F/C operation and at the same time the execution conditions for carrying out the failure determination are satisfied, the program proceeds to a step S37 in FIG. 5, wherein it is determined whether or not the immediately preceding value MFCCHK1 of the monitor flag MFCCHK assumes "1".

If the answer to the question of the step S37 is negative (No), i.e. if MFCCHK1≠1 holds, which means this is a first loop carried out after the engine 3 has entered the F/C operation and at the same time the execution conditions for the failure determination during the F/C operation are satisfied, the program proceeds to a step S38, wherein it is determined whether or not the immediately preceding value F_SZONE1 of the flag F_SZONE is equal to "1".

If the answer to the question of the step S38 is negative (No), i.e. F_SZONE1=0 holds, which means that the air-fuel ratio was lean in the immediately preceding loop of the process, the program proceeds to a step S46, wherein the flag F_AFCCHK is set to "1", and the F_FCTM is set to "0", followed by terminating the program. As described above, when the engine 3 enters the F/C operation from the lean air-fuel ratio operating condition, the failure determination is not carried out since it is assumed that the signal value SVO2 of the signal from the O2 sensor 25 is not changed from the low level.

On the other hand, if the answer to the question of the step S38 is affirmative (Yes), i.e. if F_SZONE1=1 holds, which means the air-fuel ratio was rich in the immediately preceding loop and at the same time the engine 3 has entered the F/C operation in the present loop, the program proceeds to a step S39.

Further, if the answer to the question of the step S37 is affirmative (Yes), i.e. if MFCCHK1=1 holds, which means the engine 3 entered the F/C operation in the immediately preceding or earlier loop, the program proceeds to the step S39 by skipping over the step 38.

At the step S39, it is determined whether or not the flag F_AFCCHK assumes "1". If the answer to the question of the step S39 is affirmative (Yes), i.e. if the flag F_AFCCHK=1 holds, which means that the engine 3 entered the F/C operation from a lean air-fuel ratio operating condition in the immediately preceding or earlier loop, the program is terminated without carrying out the failure determination. On the other hand, if the answer to the question of the step S39 is negative (No), i.e. if F_AFCCHK=1 holds, the program proceeds to a step S40, wherein it is determined whether or not the timer tmFCCHK has timed out.

If the answer to the question of the step S40 is negative (No), i.e. if tmFCCHK≠0 holds, which means that the predetermined time period #TFCCHK, described hereinabove, has not yet elapsed, the program proceeds to a step S47, wherein the flag F_FCTM is set to "1", followed by terminating the program. On the other hand, if the answer to the question of the step S40 is affirmative (Yes), i.e. if tmFCCHK=0 holds, which means that the predetermined time period #TFCCHK has elapsed, the program proceeds to a step S41, wherein it is determined whether or not the flag F_SZONE assumes "0".

If the answer to the question of the step S41 is affirmative (Yes), i.e. if F_SZONE=0 holds, which means that the signal value SVO2 of the signal from the O2 sensor 25 crossed the predetermined threshold value #SVO2CHK to shift from the high level (rich region) to the low level (lean region), it is determined that the O2 sensor is normally operating, and the program proceeds to a step S42, wherein a failure determination flag F_OK is set to "1". On the other hand, if the answer to the question of the step S41 is negative (No), i.e. if F_SZONE=1 holds, which means that the signal value SVO2 remains at the high level without crossing the predetermined threshold value #SVO2CHK, it is determined that the O2 sensor has failed, and the program proceeds to a step S43, wherein a fail safe flag F_FSD is set to "1", and at the same time the failure determination flag F_OK is set to "0". As described above, the failure determination flag F_OK is set to "1" when the O2 sensor 25 is normally operating, whereas when the O2 sensor has failed, the failure determination flag F_OK is set to "0".

After execution of the step S42 or S43, the program proceeds to a step S44, wherein the flag F_AFCCHK and the flag F_FCTM are set to "1". Then, the program proceeds to a step S45, wherein the flag F_DONE is set to "1", followed by terminating the program. As described above, the flag F_DONE is set to "1" when failure determination is carried out.

If the answer to the question of the step S36 is negative (No), i.e. if MFCCHK≠1 holds, the program proceeds to a step S48 in FIG. 6, wherein it is determined whether or not the monitor flag MFCCHK assumes "2".

If the answer to the question of the step S48 is affirmative (Yes), i.e. if the execution conditions for carrying out failure determination after termination of the F/C operation are satisfied, it is determined at steps S49 and S50 whether or not the flag F_FCTM assumes "0", and whether or not the flag F_AFCCHK assumes "1", respectively.

If each of the answers to the questions of the steps S49 and S50 is affirmative (Yes), i.e. if F_FCTM=0 and F_AFCCHK="1" hold, which means that failure determination was not carried out during the F/C operation since the engine 3 entered the F/C operation from the lean air-fuel ratio operating condition, the program proceeds to a step S51, wherein it is determined whether or not the flag F_SZONE assumes "1".

If the answer to the question of the step S51 is affirmative (Yes), i.e. if the signal value SVO2 of the signal from the O2 sensor 25 is larger than the predetermined threshold value #SVO2CHK, it is judged that the signal value SVO2 crossed the predetermined threshold value #SVO2CHK after the termination of the F/C operation, and hence the O2 sensor 25 is normally operating, so that the program proceeds to a step S52, wherein the failure determination flag F_OK is set to "1" so as to indicate the normally operating state of the O2 sensor 25. Then, the above-mentioned steps S44 and S45 are carried out, followed by terminating the program.

On the other hand, if the answer to the question of the step S51 is negative (No), i.e. if the signal value SVO2 is equal to or smaller than the predetermined threshold value #SVO2CHK (the signal value SVO2 has not crossed the predetermined threshold value #SVO2CHK), the program proceeds to a step S53, wherein it is determined whether or not the integrated amount flag F_SVCH assumes "1".

If the answer to the question of the step S53 is negative (NO), it is judged that the amount of supply of exhaust gases to the catalyst device 8 after the termination of the F/C operation is insufficient, and the step S56 is executed, followed by terminating the program.

On the other hand, if the answer to the question of the step S53 is affirmative (YES), it is judged that in spite of the sufficient supply of exhaust gases to the catalyst device 8 after the termination of the F/C operation, it is not confirmed that the signal value SVO2 has crossed the predetermined value #SVO2CHK in an increasing direction, and hence judged that the O2 sensor has failed. To indicate the failure of the O2 sensor, the program proceeds to a step S54, wherein the failsafe flag F_FSD is set to "1" similarly to the step S43, and at the same time the failure determination flag F_OK is set to "0". Then, the steps S44 and S45 are carried out, followed by terminating the program.

As described hereinbefore, if the execution conditions for the failure determination after termination of an F/C operation are satisfied, it is always monitored whether or not the signal value SVO2 has exceeded the predetermined threshold value #SVO2CHK (whether or not the air-fuel ratio has become rich), and the instant the condition of SVO2>#SVO2CHK is satisfied, it can be determined that the O2 sensor 25 is normally operating. Similarly, it is always monitored whether or not the integrated amount SUMSVS is equal to or larger than the predetermined value #SUMSVAFC, whereby even if SVO2≦#SVO2CHK holds, it is possible to determine that the O2 sensor 25 has failed the instant the condition of SUMSVS≧#SUMSVAFC is satisfied.

On the other hand, If the answer to the question of either of the step S49 or S50 is negative (NO), i.e. if the duration of the F/C operation is short, or the predetermined time period #TMFCCKD has elapsed after termination of the F/C operation, the step S55 is carried out without executing the determination of the step S51, followed by terminating the program.

On the other hand, if the answer to the question of the step S48 is negative (No), i.e. if MFCCHK≠2 (=0) holds, which means that the predetermined time period #TMFCCKD has elapsed after termination of the F/C operation, the above steps S55 and S56 are carried out, followed by terminating the program. Thus, if the integrated amount SUMSVS does not reach the predetermined value #SUMSVAFC, and the at the same time, the signal value SVO2 has not crossed the predetermined threshold value #SVO2CHK, the failure determination is suspended upon the lapse of the predetermined time period #TMFCCKD after termination of the F/C operation. This makes it possible to prevent an increase in an error in the integrated amount SUMSVS of exhaust gases resulting from a long-term integration of a small amount of supply of exhaust gases thereto, and thereby prevent an erroneous determination of a failure of the O2 sensor due to an erroneous value of the integrated amount SUMSVS of exhaust gases.

The timing chart shown in FIG. 7 illustrates examples of changes in the vehicle speed VP, the signal value KACT of the signal from the LAF sensor 24, the signal value SVO2 of the signal from the O2 sensor 25, and the desired air-fuel ratio KCMD, which take place during the above-mentioned executable condition determination process and failure determination process for determining a failure of the O2 sensor 25, together with changes in the flags F_DECFC, F_MCND, and the monitor flag MFCCHK.

As shown in the figure, when the execution conditions for failure determining are satisfied (flag F_MCND=1), if the F/C operation is started during vehicle deceleration (time t1), the flag F_DECFC varies from "0" to "1". In synchronism with this change in the flag F_DECFC, the desired air-fuel ratio KCMD is set to a lean value, and at the same time the monitor flag MFCCHK is changed from "0" to "1".

In accordance with this change in the monitor flag MFCCHK, if the O2 sensor is normally operating, the signal value SVO2 crosses the predetermined threshold value #SVO2CHK with a slight delay from the time t1 from the high level side to the low level side. When the predetermined time period #TFCCHK has elapsed after the start of the F/C operation (the timer tmFCCHK has timed out), the failure determination (the above steps S41 to S43) is carried out on the O2 sensor 25 based on the change in levels of the signal value SVO2.

Then, the flag F_DECFC is changed from "1" to "0" at a time point (time t2) of termination of the F/C operation. In synchronism with this change in the flag F_DECFC, the desired air-fuel ratio KCMD is set to a richer value (1.2) than the stoichiometric air-fuel ratio, and at the same time the monitor flag MFCCHK is changed from "1" to "2". The desired air-fuel ratio KCMD is held at the richer value during a time period from the time t2 up to a time t3. Further, for instance, when the failure determination was not carried out during the F/C operation due to a lean air-fuel ratio operating condition before the start of the F/C operation (the answer to the question of the step S38 was negative (No)), the failure determination (the above steps S49 to S51) is carried out on the O2 sensor 25 during a determination time period from the time t2 up to a time t4 at which the predetermined time period #TMFCCHK elapses after the time t2.

As shown by a solid line in FIG. 7(c) (however, as to a portion before t2, it is assumed that as shown by one-dot-chain lines, the actual air-fuel ratio KACT is smaller than 1.0, and hence the signal value SVO2 is also smaller than the predetermined threshold value #SVO2CHK, so that the O2 sensor failure determination during the F/C operation is not carried out), if the O2 sensor is normally operating, the signal value SVO2 of the signal from the O2 sensor 25 crosses the predetermined threshold value #SVO2CHK from the low level side to the high level side within the above determination time period, so that the O2 sensor is determined to be normally operating. On the other hand, if the O2 sensor has failed, the signal value SVO2 does not cross the predetermined threshold value #SVO2CHK until the predetermined time period #TMFCCKD elapses, and when the integrated amount SUMSVS of exhaust gases reaches the predetermined value #SUMSAFC, it is determined that the O2 sensor 25 has failed. Further, as shown by a broken line in the figure, if the signal value SVO2 does not cross the predetermined threshold value #SVO2CHK but remains at a low level, and at the same time, the integrated amount SUMSVS of exhaust gases remains smaller than the predetermined value #SUMSAFC, when the predetermined time period #TMFCCKD has elapsed (time t4), it is judged that the supply of exhaust gases to the O2 sensor 25 is insufficient, and the failure determination on the O2 sensor 25 is suspended. Further, at the time t4, the monitor flag MFCCHK is changed from "2" to "0". A time t5 thereafter in FIG. 7 indicates a time point when the flag F_MCND has been changed form "1" to "0" due to a decrease in the engine rotational speed NE, or the like.

As described above in detail, according to the apparatus 1 of the invention, during the predetermined time period #TMFCCKD after termination of an F/C operation, if the signal value SVO2 crosses the predetermined threshold value #SVO2CHK before the integrated amount SUMSVS of exhaust gases reaches the predetermined value #SUMSVAFC, it is determined at this time point that the O2 sensor 25 is normally operating. Further, during the predetermined time period #TMFCCKD after termination of the F/C operation, if the signal value SVO2 does not cross the predetermined threshold value #SVO2CHK until the integrated amount SUMSVS of exhaust gases reaches the predetermined value #SUMSVAFC, it is determined at this time point that the O2 sensor has failed. Thus, a failure of the O2 sensor 15 is determined based on the signal value SVO2 when the integrated amount SUMSVS of exhaust gases reaches the predetermined value #SUMSVAFC, and therefore, even when the amount of exhaust gases is small, it is possible to determine the failure of the O2 sensor 25 when exhaust gases are supplied to the catalyst device 8 in a sufficient amount, i.e. when the catalyst device 8 has recovered from its excess oxygen-storing state. This enables accurate determination of a failure of the oxygen concentration sensor.

On the other hand, if the predetermined time period #TMFCCKD has elapsed with the signal value SVO2 remaining smaller than the predetermined threshold value #SVO2CHK without the integrated amount SUMSVS reaching the predetermined value #SUMSVAFC, the determination of a failure of the O2 sensor 25 is suspended. This makes it possible to prevent an increase in an error in the integrated amount SUMSVS of exhaust gases resulting from a long-term integration of a small amount of supply of exhaust gases thereto, and thereby prevent an erroneous determination of a failure of the O2 sensor due to an erroneous value of the integrated amount SUMSVS of exhaust gases. Further, the determination of failure of the O2 sensor 25 is suspended with reference to the predetermined time period #TMFCCKD elapsed after the termination of the F/C operation, it is possible to properly set the timing of discontinuation of the O2 sensor failure determination process.

Next, a second embodiment of the invention will be described. This embodiment is distinguished from the first embodiment in that the ECU 2 also functions as timer means, and an executable condition determination process and a failure determination process are partially different from those of the first embodiment. Therefore, basically, description of steps of these processes of the present embodiment assigned with the same step numbers as those in FIGS. 2 to 6, including steps which are identical to those in FIGS. 4 and 5 and are precedent to steps shown in FIG. 9 are omitted, and only different portions and portions closely related therewith will be described.

Figure 8:
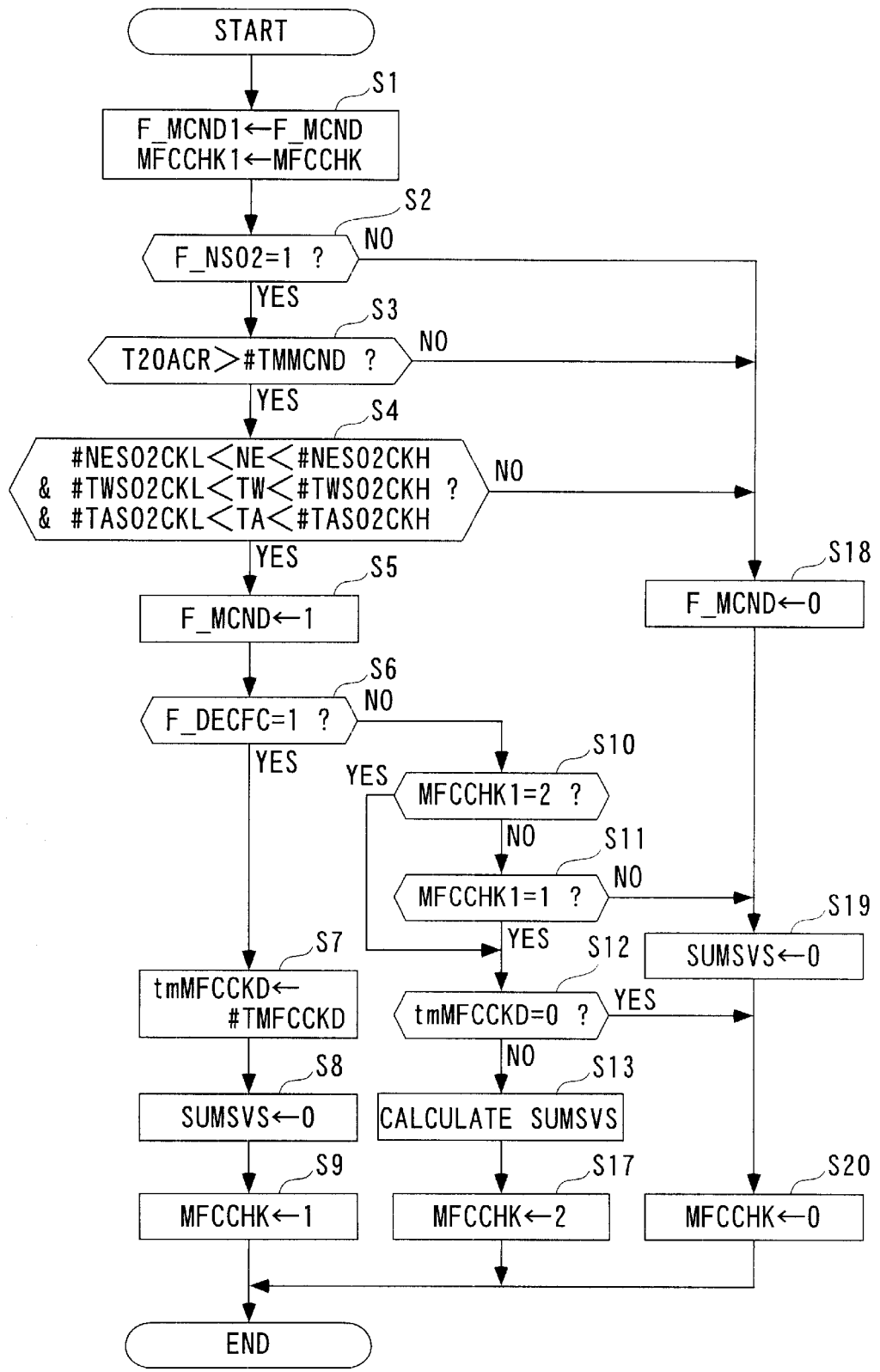
FIG. 8 is a flowchart showing a program executed by an apparatus for determining a failure of an oxygen concentration sensor, according to a second embodiment, for carrying out an executable condition determination process for determining a failure of the sensor.

First, FIG. 8 is a flowchart showing a program of the executable condition determination process for determining whether or not the failure determination can be executed, and corresponds to the whole of the flowcharts shown in FIGS. 2 and 3. This process is distinguished from the corresponding process of the first embodiment in that after the step S13 wherein the calculation of the integrated amount SUMSVS is carried out, the program directly proceeds to a step S17, wherein the monitor flag MFCCHK is set to "2", followed by terminating the program. That is, in the executable condition determination process, the steps of setting the integrated amount flag F_SVCH depending on whether or not the supply of exhaust gases to the catalyst device 8 after termination of an F/C operation is sufficient are omitted.

Figure 9:
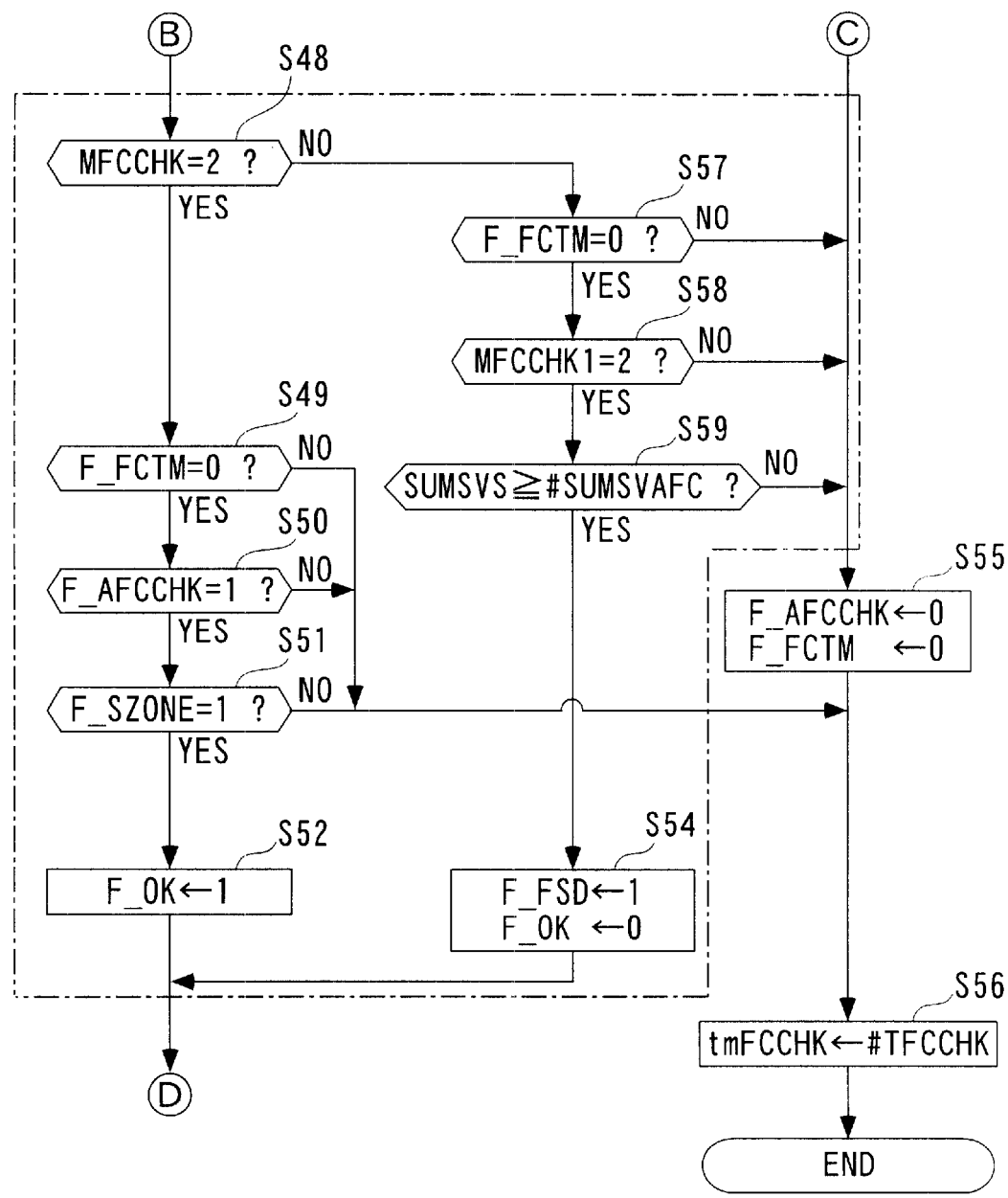
FIG. 9 is a flowchart showing part of a program executed by the apparatus according the second embodiment, for carrying out a failure determination process for determining a failure of the oxygen concentration sensor, which includes a portion of the program executed particularly after termination of a fuel cut-off operation.

Further, FIG. 9 corresponds to FIG. 6, and shows a portion of the failure determination process mainly including steps executed after termination of an F/C operation. Since the other portions precedent to this portion are identical to those shown in FIGS. 4 and 5, figures and description thereof are omitted. In the FIG. 9 portion of the failure determination process, if the answer to the question of the step S48 is affirmative (YES), i.e. if the execution conditions for the failure determination after termination of an F/C operation are satisfied, it is determined at steps S49 and S50 whether or not the flag F_FCTM assumes "0", and whether or not the flag F_AFCCHK assumes "1", respectively.

If the answers to the questions of the steps S49 and S50 are affirmative (Yes), i.e. if F_FCTM=0 and F_AFCCHK="1" hold, which means that the failure determination on the O2 sensor 25 was not carried out during the F/C operation since the engine 3 had entered the F/C operation from the lean air-fuel ratio operating condition, the program proceeds to a step S51, wherein it is determined whether or not the flag F_SZONE assumes "1".

If the answer to the question of the step S51 is affirmative (Yes), i.e. if the signal value SVO2 of the signal from the O2 sensor 25 is larger than the predetermined threshold value #SVO2CHK, it is determined that the signal value SVO2 crossed the predetermined threshold value #SVO2CHK after the termination of the F/C operation, and that the O2 sensor 25 is normally operating, and the program proceeds to a step S52, wherein the failure determination flag F_OK is set to "1" so as to indicate the normally operating state of the O2 sensor 25. Then, the above-mentioned steps S44 and S45 are carried out, followed by terminating the program.

On the other hand, if the answer to the question of the step S51 is negative (No), i.e. if the signal value SVO2 is equal to or smaller than the predetermined threshold value #SVO2CHK (the signal value SVO2 has not crossed the predetermined threshold value #SVO2CHK), the above step S56 is executed, followed by terminating the program.

As described hereinbefore, if the execution conditions for failure determination after termination of an F/C operation are satisfied, it is always monitored whether or not the signal value SVO2 has exceeded the predetermined threshold value #SVO2CHK (whether or not the air-fuel ratio has become rich), and the instant the condition of SVO2>#SVO2CHK is satisfied, it can be determined that the O2 sensor 25 is normally operating.

On the other hand, If either of the answers to the questions of the steps S49 and S50 is negative (No), i.e. if an F/C operation time period was short, or if the engine had not entered the F/C operation from a lean air-fuel ratio operating condition of the engine, the above step S56 is carried out by skipping over the determination at the step S51, followed by terminating the program.

If the answer to the question of the step S48 is negative (No), i.e. if MFCCHK≠2 (=0) holds, it is determined at steps S57 and S58 whether or not the flag F_FCTM assumes "0", and whether or not the immediately preceding value MFCCHK1 of the monitor flag MFCCHK is equal to "2", respectively.

If both of the answers to the questions of the steps S57 and S58 are affirmative (Yes), i.e. if the predetermined time period #TMFCCKD has elapsed after the termination of the F/C operation before it can be confirmed that the signal value SVO2 of the signal from the O2 sensor 25 has exceeded the predetermined threshold value #SVO2CHK, the program proceeds to a step S59, wherein it is determined whether or not the integrated amount SUMSVS of exhaust gases calculated at the above step S13 is equal to or larger than the predetermined value #SUMSVAFC. This predetermined value #SUMSVAFC is set to a value large enough to cause the catalyst device 8 to recover from its excess oxygen-storing state, after the termination of the F/C operation.

If the answer to the question of the step S59 is affirmative (Yes), i.e. if SUMSVS≧#SUMSVAFC holds, it is determined that the O2 sensor 25 has failed, because it cannot be confirmed that the signal value SVO2 has crossed the predetermined threshold value #SVO2CHK, in spite of a sufficient amount of supply of exhaust gases to the O2 sensor 25 after the termination of the F/C operation, so that the program proceeds to a step S54, wherein similarly to the step S43 described above, the fail safe flag F_FSD is set to "1", and at the same time the failure determination flag F_OK is set to "0". Then, the above steps S44 to S45 are carried out, followed by terminating the program.

On the other hand, if the answer to the question of the step S59 is negative (No), i.e. if SUMSVS<#SUMSVAFC holds, which means that a sufficient amount of exhaust gases has not been supplied to the O2 sensor 25 over the predetermined time period #TMFCCKD after the termination of the F/C operation, the above steps S55 and S56 are carried out without carrying out the failure determination on the O2 sensor 25, followed by terminating program. This makes it possible to prevent erroneous determination of a sensor failure, which is caused by an insufficient supply of exhaust gases to the O2 sensor 25.

If the answer to the question of the step S57 or S58 is negative (No), i.e. if F_FCTM=1 or MFCCHK1≠2 holds, which means the F/C operation time period was short, or this loop is not carried out immediately after the lapse of the predetermined time period #TMFCCKD, the above steps S55 and 56 are carried out by skipping over the failure determination at the step S59, followed by terminating the program.

Different points of the second embodiment from the first embodiment will be described with reference to FIG. 7 timing chart. During a determination time period from the time t2 to the time t4 at which the predetermined time period #TMFCCKD elapses after the time t2, the failure determination (steps 49 to 51) on the O2 sensor 25 is carried out similarly to the first embodiment.

More specifically, as shown by the solid line in FIG. 7(*c*) (however, as to the portion before t2, it is assumed that as shown by the one-dot-chain lines, the actual air-fuel ratio KACT is smaller than 1.0, and hence the signal value SVO2 is also smaller than the predetermined threshold value #SVO2CHK, so that the O2 sensor failure determination during the F/C operation is not carried out), if the signal value SVO2 of the signal from the O2 sensor 25 crosses the predetermined threshold value #SVO2CHK from the high level side to the low level side within the above determination time period, the O2 sensor is determined to be normally operating. This is the same as in the first embodiment. On the other hand, as shown by the broken line in the figure, if the signal value SVO2 remains at the low level without crossing the predetermined threshold value #SVO2CHK, the failure determination is carried out based on the integrated amount SUMSVS of exhaust gases when the predetermined time period #TMFCCKD has elapsed (time t4). More specifically, when the integrated amount SUMSVS is equal to or larger than the predetermined value #SUMSVAFC, it is determined that the O2 sensor 25 has failed, whereas when the integrated amount SUMSVS is smaller than the predetermined value #SUMSVAFC, it is judged that a sufficient amount of exhaust gases has not been supplied to the O2 sensor 25, so that the failure determination is suspended. Further, at the time t4, the monitor flag MFCCHK is changed from "2" to "0". A time t5 thereafter in FIG. 7 indicates a time point when the flag F_MCND is changed from "1" to "0" due to a decrease in the engine rotational speed NE, or the like.

As described above in detail, according to the apparatus 1 of the second embodiment, it is determined whether or not the signal value SVO2 of the signal from the O2 sensor 25 has crossed the predetermined threshold value #SVO2CHK after termination of an F/C operation, and the integrated amount SUMSVS of exhaust gases exhausted after the termination of the F/C operation is calculated. When the signal value SVO2 crosses the predetermined threshold value #SVO2CHK during a time period from a time point of the termination of the F/C operation up to a time point the predetermined time period #TMFCCKD has elapsed after the termination of the F/C operation, it is determined at this time point that the O2 sensor 25 is normally operating. Further, when the predetermined time period #TMFCCKD has elapsed with the signal value SVO2 remaining at the low level equal to or smaller than the predetermined threshold value #SVO2CHK, it is determined that the O2 sensor 25 has failed on condition that the integrated amount SUMSVS is equal to or larger than the predetermined value #SUMSVAFC.

On the other hand, if the integrated amount SUMSVS is smaller than the predetermined value #SUMSVAFC, the failure determination on the O2 sensor 25 is suspended. Thus, when the predetermined time period #TMFCCKD has elapsed after the termination of the F/C operation, if exhaust gases are not sufficiently supplied to the O2 sensor although the signal value SVO2 of the signal from the O2 sensor 25 has not crossed the predetermined threshold value #SVO2CHK, differently from the conventional apparatus, the failure determination on the O2 sensor 25 is not carried out. This makes it possible to prevent erroneous determination of a failure of the O2 sensor 25, which is caused by an insufficient supply of exhaust gases to the O2 sensor 25.

Further, in the first and second embodiments of the invention described above, an air-fuel mixture richer than the stoichiometric air-fuel ratio is supplied to the engine 3 immediately after termination of an F/C operation, whereby exhaust gases containing a high concentration of HC (hydrocarbon) and a high concentration of CO (carbon monoxide) are supplied to the catalyst device 8. This makes it possible to positively cause consumption of oxygen stored in the catalyst device 8 during the F/C operation, thereby causing the catalyst device 8 to promptly recover from its excess oxygen-storing state. As a result, exhaust gases with a rich air-fuel ratio, i.e. having a low concentration of oxygen can be supplied to the O2 sensor 25 soon after the termination of the F/C operation, whereby it is possible to promptly determine a failure of the O2 sensor, as described above.

Although in the first and second embodiments described hereinabove, as the oxygen concentration sensor, a type is employed whose output voltage value is changed between a high level and a low level depending on the air-fuel ratio of an air-fuel mixture, this is not limitative, but in place of this type of oxygen concentration sensor, there may be used a so-called LAF sensor which linearly detects the concentration of oxygen in exhaust gases, and delivers a signal proportional to the sensed concentration of oxygen. In this case, the predetermined threshold value may be set to a value which is positively crossed by a signal value of the signal when the air-fuel ratio is changed between a rich region and a lean region, e.g. a value equal to or close to a value corresponding to the stoichiometric air-fuel ratio. Further, an oxygen concentration sensor may be employed which outputs a voltage value reverse in level to a voltage value output by the O2 sensor 25.

It is further understood by those skilled in the art that the foregoing is a preferred embodiment of the invention, and that various changes and modifications may be made without departing from the spirit and scope thereof.

What is claimed is:

1. An apparatus for determining a failure of an oxygen concentration sensor of an internal combustion engine that includes an exhaust system, and a catalyst arranged in said exhaust system, and is capable of carrying out a fuel cut-off operation, said oxygen concentration sensor being arranged in said exhaust system at a location downstream of said catalyst, for generating a signal indicative of a sensed concentration of oxygen in exhaust gases, the apparatus comprising:

oxygen concentration change-determining means for determining whether or not a signal value of said signal from said oxygen concentration sensor has crossed a predetermined threshold value after termination of said fuel cut-off operation;

exhaust gas amount calculation means for calculating an integrated amount of said exhaust gases exhausted from said engine after said termination of said fuel cut-off operation; and failure determination means for determining that said oxygen concentration sensor has failed when said oxygen concentration change-determining means determines that said signal value has not crossed said predetermined threshold value, in the case of said integrated amount of said exhaust gases having reached a predetermined value.

2. An apparatus according to claim 1, further including failure determination-suspending means for suspending determination of said failure of said oxygen concentration sensor by said failure determination means, when a predetermined time period has elapsed after said termination of said fuel cut-off operation, on condition that said integrated amount of said exhaust gases has not reached said predetermined value, and at the same time, said oxygen concentration sensor determines that said signal value has not crossed said predetermined threshold value.

3. An apparatus according to claim 2, further including air-fuel mixture-enriching means that makes an air-fuel mixture supplied to said internal combustion engine immediately after said termination of said fuel cut-off operation, richer than a stoichiometric air-fuel ratio.

4. An apparatus according to claim 1, further including air-fuel mixture-enriching means that makes an air-fuel mixture supplied to said internal combustion engine immediately after said termination of said fuel cut-off operation, richer than a stoichiometric air-fuel ratio.

5. An apparatus for determining a failure of an oxygen concentration sensor of an internal combustion engine that includes an exhaust system, and a catalyst arranged in said exhaust system, and is capable of carrying out a fuel cut-off operation, said oxygen concentration sensor being arranged in said exhaust system at a location downstream of said catalyst, for generating a signal indicative of a sensed concentration of oxygen in exhaust gases, the apparatus comprising:

timer means for measuring a time period elapsed after termination of said fuel cut-off operation;

oxygen concentration change-determining means for determining whether or not a signal value of said signal from said oxygen concentration sensor has crossed a predetermined threshold value after said termination of said fuel cut-off operation;

exhaust gas amount calculation means for calculating an integrated amount of said exhaust gases exhausted from said engine after said termination of said fuel cut-off operation;

failure determination means for determining said failure of said oxygen concentration sensor based on a result of determination of said oxygen concentration change-determining means; and failure determination-suspending means for suspending said determination of said failure of said oxygen concentration sensor by said failure determination means, when said time period measured by said timer means has reached a predetermined time period, on condition that said oxygen concentration sensor determines that said signal value has not crossed said predetermined threshold value, and at the same time said integrated amount of said exhaust gases has not reached a predetermined value.

6. An apparatus according to claim 5, further including air-fuel mixture-enriching means that makes an air-fuel mixture which is supplied to the internal combustion engine immediately after said termination of said fuel cut-off operation, richer than a stoichiometric air-fuel ratio.

* * * * *